(12) United States Patent
Hoult et al.

(10) Patent No.: US 7,378,657 B2
(45) Date of Patent: May 27, 2008

(54) SMALL DETECTOR ARRAY FOR INFRARED IMAGING MICROSCOPE

(75) Inventors: Robert Alan Hoult, Bucks (GB); Andrew James Turner, Bucks (GB)

(73) Assignee: PerkinElmer International C.V. (CH)

( * ) Notice: Subject to any disclaimer, the term of this patent is extended or adjusted under 35 U.S.C. 154(b) by 602 days.

(21) Appl. No.: 09/942,131

(22) Filed: Aug. 29, 2001

(65) Prior Publication Data
US 2002/0033452 A1   Mar. 21, 2002

(30) Foreign Application Priority Data
Aug. 29, 2000   (EP) ................................. 00307372

(51) Int. Cl.
*G01J 5/02*   (2006.01)
(52) U.S. Cl. .................. 250/349; 250/339.02
(58) Field of Classification Search ................ 250/349, 250/339.02, 347
See application file for complete search history.

(56) References Cited

U.S. PATENT DOCUMENTS

| | | | |
|---|---|---|---|
| 5,091,646 A * | 2/1992 | Taylor | 250/332 |
| 5,120,953 A * | 6/1992 | Harris | 250/227.2 |
| 5,512,749 A * | 4/1996 | Iddan et al. | 250/332 |
| 5,712,685 A * | 1/1998 | Dumas | 348/360 |
| 5,880,470 A * | 3/1999 | Umetani et al. | 250/370.09 |
| 6,274,871 B1 * | 8/2001 | Dukor et al. | 250/339.08 |
| 6,396,048 B1 * | 5/2002 | Schanz et al. | 250/214 LA |
| 2003/0071216 A1 * | 4/2003 | Rabolt | 250/339.02 |

FOREIGN PATENT DOCUMENTS

| | | |
|---|---|---|
| EP | 0 380 904 | 2/1989 |
| EP | 0 731 371 | 3/1995 |

OTHER PUBLICATIONS

D.W. Schiering, et al., "An FTIR microscope", *American Laboratory*: 33, pp. 26-40, Nov. 1990.

* cited by examiner

*Primary Examiner*—Christine Sung
(74) *Attorney, Agent, or Firm*—St. Onge Steward Johnston & Reens LLC

(57) ABSTRACT

An infrared imaging microscope, particularly of the type used to carry out FT-IR measurement, has a detector in the form of a small detector array of individual detector elements. The outputs of the detector elements are fed in parallel to processing means which process the output signals. The use of a small array means that the outputs can be processed without the need for complex multiplexing or perhaps no multiplexing at all thus avoiding the reduction in signal to noise ratio which is associated with large scale multiplexing. The small detector array will generally have between 3 and 100 detector elements. Typically the upper limit will be 64 and a preferred arrangement has 16 detector elements.

32 Claims, 4 Drawing Sheets

SMALL DETECTOR ARRAY FOR INFRARED IMAGING MICROSCOPE

This invention relates to an infrared imaging microscope particularly of the type used to carry out FT-IR measurements.

A known apparatus of this type is an FT-IR microscope which is used to analyse small samples of material. The microscope has a viewing configuration and a measurement configuration. In both configurations the microscope can be used either in a transmitting mode or a reflecting mode depending upon the nature of the sample. Typically such a microscope is used in conjunction with an IR spectrophotometer. A microscope of this type generally includes a source of visible radiation and can receive analysing infrared radiation from a source in the spectrophotometer. A typical microscope includes a sample stage for carrying a sample to be investigated and optical elements for guiding radiation from one or other of the radiation sources to the sample stage. These elements can include a plain mirror, a toroid coupling optic and a Cassegrain mirror assembly acting as a condenser. The microscope also includes a Cassegrain mirror assembly which images the sample at a given magnification at an intermediate image plane from where the radiation is directed to an infrared detector. The microscope also includes an optical microscope which enables an image of the sample on the stage to be viewed optically by means of visible radiation and thereby enables areas of interest to be identified. The microscope can also include a video camera which can be used in conjunction with the optical microscope in order to create an image of the sample for display on a display means or a computer which is used to control the microscope.

Modern microscopes of this type have a stage which can be moved under computer control to allow several areas of interest to be identified, their coordinates stored and data collected subsequently automatically on the basis of that stored data. Such microscopes also include a variable aperture which can be computer controlled and is located at the intermediate image plane to mask off a portion of the sample. This combined with an oversized single detector element enables the measurement of the infrared spectrum of the selected area of the sample. By stepping the stage and repeating the measurement, the system can slowly build up a digital image of the sample pixel-by-pixel. An arrangement of this type is described in EP-A-0731371. Typically such microscopes employ a liquid nitrogen cooled, photoconductive mercury cadmium telluride (MCT) element as the infrared detector. Such a microscope has relatively long measurement times and it can take of the order of 10 hours to acquire a 128×128 pixel image.

In order to reduce measurement times microscopes have been designed which incorporate large detector arrays rather than single detector elements. One such arrangement uses an integrated array of 64×64 liquid nitrogen cooled photovoltaic MCT detectors each having an area of 60 microns square. This array is capable of acquiring a 64×64 pixel image simultaneously rather than sequentially as in the system referred to above. With such an arrangement it is possible to reduce considerably the measurements times and, for example, a 128×128 map can be acquired in around 5 to 7 minutes. Such arrangements however are extremely expensive and typically cost more than 3 times that of a microscope which employs a single detector. Part of this increased cost is due to the cost of the detector itself which is relatively expensive and another part is attributed to the fact that the slow read out of the multiplexed detector necessitates the use of a sophisticated spectrometer technology called step-scan.

Although such large arrays offer the advantage of speed of measurement through the acquisition of many pixels in parallel, currently available devices suffer from a loss of signal/noise ratio when compared with the projected performance based on a single array element. The loss arises from inefficiencies incurred in the multiplexing needed to handle the signals from such a large number of elements. In addition, the photovoltaic technology used in these arrays results in a reduced wavelength range when compared with the photoconductive devices used as single element detectors.

The present invention is concerned with a detector array which can be used with an infrared imaging microscope and can provide the benefits of reduced measurement times without the significant increase in costs associated with the large detector arrays referred to above.

According to one aspect of the present invention there is provided an IR microscope comprising a sample stage, optical components for guiding analysing radiation so that it is incident on a sample to be analysed which is carried on said stage, and for guiding radiation from the sample to a detector, wherein said detector comprises a small array of individual detector elements, the outputs of the detector elements being fed in parallel to processing means for processing the detector element outputs.

Thus the present invention proposes using in an infrared imaging microscope a relatively small detector array whose outputs are sufficiently small in number that they can be processed without the need for complex multiplexing or perhaps any multiplexing at all. Thus the microscope does not incur the reduction in signal to noise ratio which is a feature of large scale multiplexing. Such a detector array can be used in such a way as to provide relatively low measurement times without any substantial increase in cost of either the detector array or the processing circuitry needed to process the outputs of the detector elements. In addition, it becomes more practical to employ photoconductive technology for the detector elements, permitting an increased range to longer wavelength. A small detector array will typically comprise between 3 and 100 detector elements. Typically the upper limit will be 64 and a preferred arrangement will have 16.

Each detector element may have its own associated detector circuitry. The detector elements can be arranged in a linear array. The detecting elements of the linear array may be spaced apart.

The detector elements may be arranged in a plurality of rows. The detector elements in each row may be spaced apart and the rows themselves may be spaced apart.

The detector elements in each row may be offset relative to those in other rows.

The detector elements may be arranged such that the centre of each element is located at a position corresponding to a point on a regular grid. The grid pattern may be square or rectangular.

The spacing between the centres of elements in each row may correspond to a multiple of the spacing of the points of the grid.

The spacing between centres of adjacent rows may correspond to a multiple of the spacing of the points of the grid.

The offset in detector element position in adjacent rows may correspond to the spacing of the grid or a multiple of the spacing of the grid.

The dimensions of each detector element may be substantially equal to that of the spacing of the grid.

The detector elements may be rectangular and aligned with the grid pattern.

Another aspect of the present invention provides a detector array for use in an IR microscope, said detector array comprising a plurality of individual detector elements which are disposed in spaced relationship, the spacing between adjacent elements being substantially equal to a dimension or a multiple of the dimension of a detector element. A detector array of this structure in which the detector elements are spaced apart facilitates connections to the detector elements and because, at any particular stage position, the areas viewed by the detector elements correspond to the spaces between detector elements at a previous stage position, an effective fill-in factor can be achieved. This avoids the problem of prior art array elements where the entire sample area may not be mapped because of dead areas at the junctions of adjacent detectors.

The detector elements may be arranged in a linear array. The detector elements of the linear array may be spaced apart.

The detector elements may be arranged in a plurality of rows. The detector elements in each row may be spaced apart and the rows themselves may be spaced apart.

The detector elements in each row may be offset relative to those in other rows.

The detector elements may be arranged such that the centre of each element is located at a position corresponding to a point on a regular grid. The grid pattern may be square or rectangular.

The spacing between the centres of elements in each row may correspond to a multiple of the spacing of the points of the grid.

The spacing between centres of adjacent rows may correspond to a multiple of the spacing of the points of the grid.

The offset in detector element position in adjacent rows may correspond to the spacing of the grid or a multiple of the spacing of the grid.

The dimensions of each detector element may be substantially equal to that of the spacing of the grid.

The detector elements may be rectangular and aligned with the grid pattern.

A further aspect of the present invention provides for a large single element detector to be deployed alongside the array as an alternative detector. This allows the microscope to be used alternatively in the more traditional single pixel mode where a mask in the intermediate image plane of the microscope is adjusted to isolate a specific portion of the sample for measurement. This capability is useful for spot measurements on sizeable areas where sensitivity is less of an issue and can be traded for further increased wavelength range in the single detector element, for some oddly shaped or oriented sample areas, and for some line scans to which the array may be ill-suited.

The invention will be described now by way of example only, with particular reference to the accompanying drawings. In the drawings.

Figure 1:
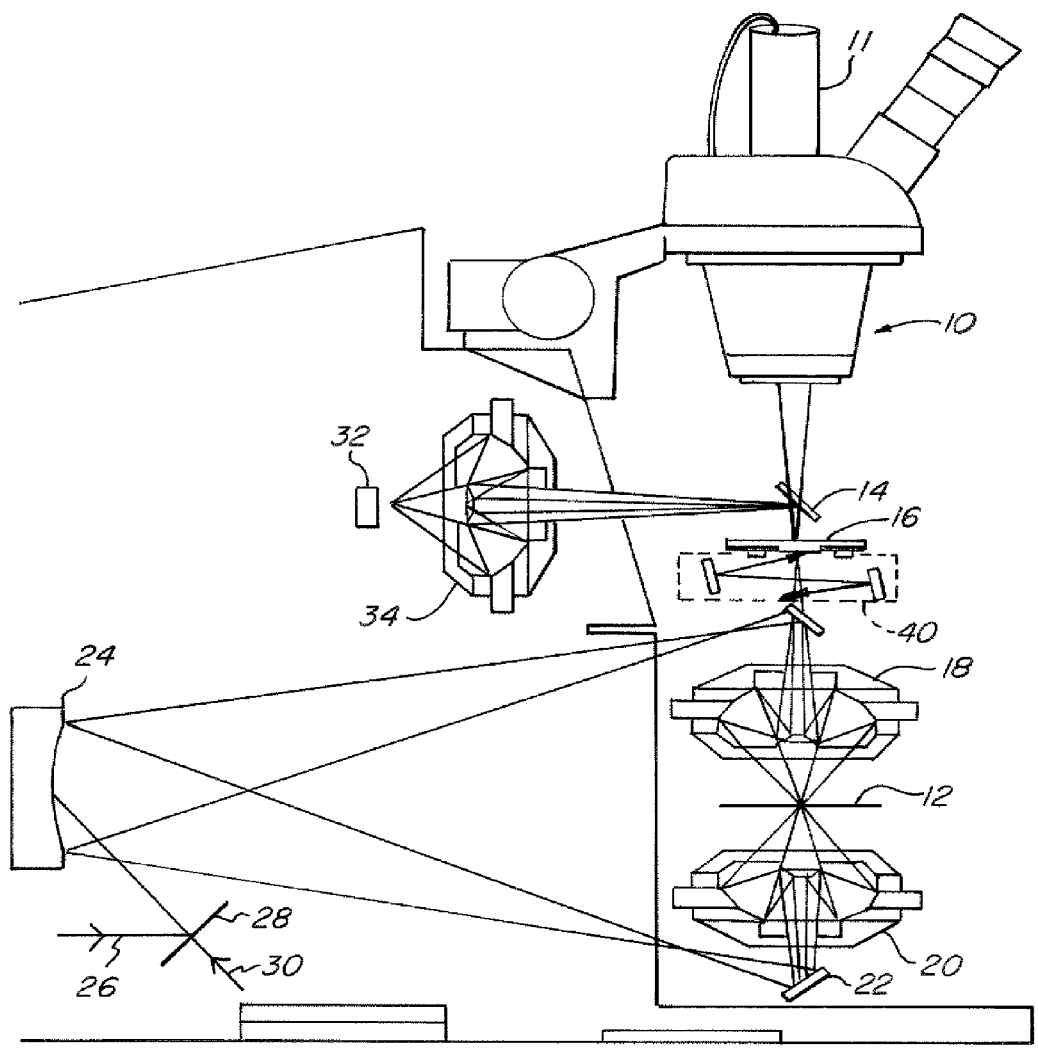
FIG. 1 is a side schematic view of an FT-IR microscope constructed in accordance with the present invention.

Referring to FIG. 1 there are shown the principal elements of an FT-IR microscope of a preferred embodiment of the present invention. This microscope includes an optical microscope (10) which can be used to view a sample on a sample stage (12) through a dichroic mirror (14), a remote aperture (16) and an objective Cassegrain mirror assembly (18). The optical microscope can incorporate a video camera (11) which is coupled to a computer which controls the microscope. The video camera (11) can be used to create on the display device of the computer a video image of a sample under investigation. The microscope also includes a condenser Cassegrain mirror assembly (20), a lower mirror (22) and a toroid reflector (24). The microscope can receive radiation from a source of infrared radiation (not shown) which may be located in an associated spectrophotometer. The incoming infrared beam (26) is directed by way of a flat dichroic mirror (28) towards the toroid reflector (24). The microscope includes a source of visible radiation (not shown) which can produce a beam (30) of visible radiation along a path which extends through the flat mirror (28). The visible radiation source can be mounted at a suitable location in the microscope.

A detector of infrared radiation such as an MCI detector (32) is disposed laterally from the dichroic mirror (14) and can receive infrared radiation reflected from that mirror by way of a detector Cassegrain mirror assembly (34). The way in which a microscope of this general form operates will be apparent to those skilled in the art and a description can be found for example in an article by D. W. Schiering, E.G. Young and T. P. Byron entitled "An FTIR microscope" published in American Laboratory, November 1990.

In microscopes of the present type the stage (12) is usually movable under computer control in at least a horizontal plane so that areas of interest of a sample located on the stage (12) can be identified using a video image generated by the video camera (11) and data relating to those locations is stored in the computer. The computer then subsequently controls movement of the stage automatically to obtain measurements from the identified areas of the sample. A detailed description of a microscope incorporating this facility can be found in EP-A-0731371.

It will be seen that the present embodiment includes an assembly which is shown at (40) and is disposed in the beam of radiation propagating towards the remote aperture (16). This is an assembly which can be moved into or out of the beam of radiation in order to change the magnification provided by the microscope. The assembly is shown in more detail in FIG. 2 of the drawings and can be seen to be located between the objective Cassegrain (18) and the position (42) where that Cassegrain normally forms its intermediate image. The assembly includes the first planar mirror (43), a first generally spherical mirror (44), a second generally spherical mirror (45) and a second planar mirror (46). The elements (43 to 46) are formed as a single integral unit which can be rotated about a horizontal axis extending through the spherical mirrors (44 and 45). Thus the assembly can be rotated from the position shown in FIG. 2 of the drawings in which the mirror (43) deflects the beam of radiation propagating from the Cassegrain objective (18) towards the mirror (44), to a position in which the mirrors (46 and 43) lie in a common horizontal plane and are therefore disposed out of the beam of radiation propagating from the Cassegrain. The assembly also includes a planar reflector (48) which acts as a cold shield as will be described later.

Figure 2:
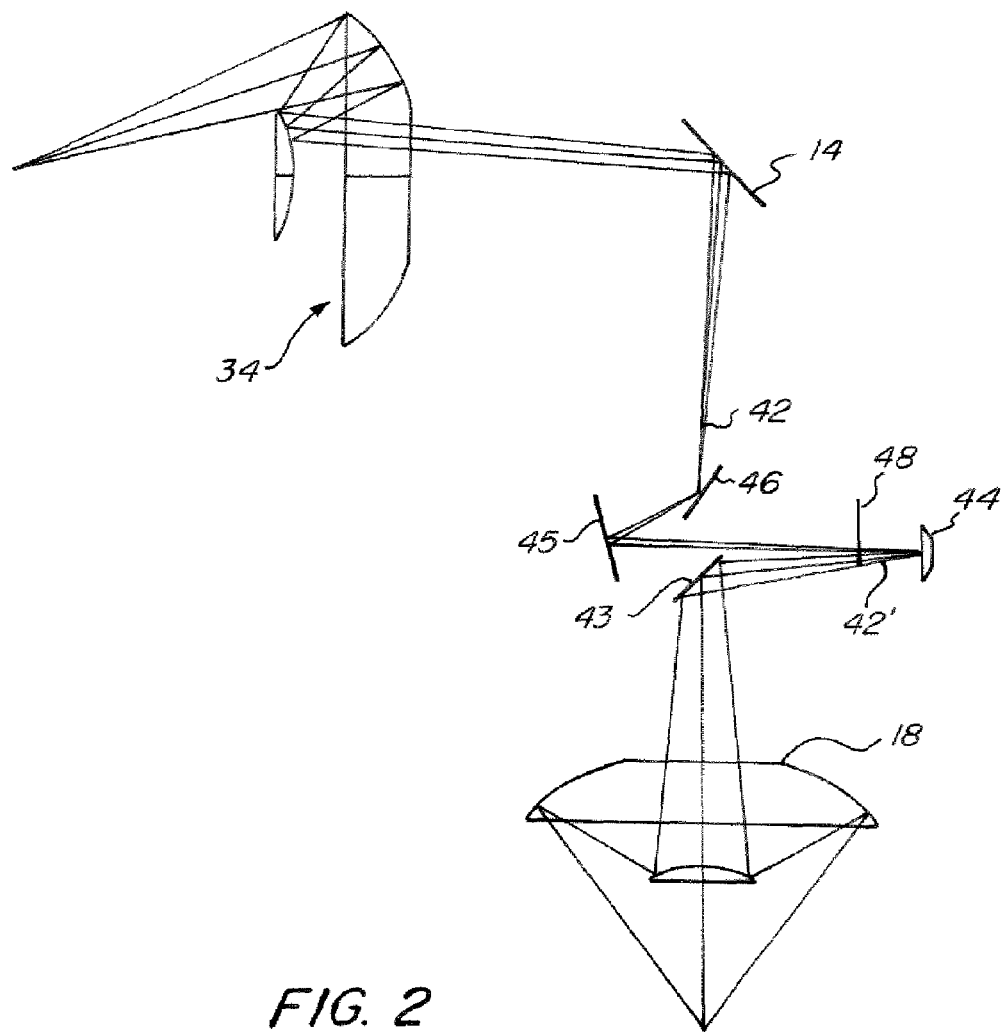
FIG. 2 is a more detailed view of a magnification assembly used in the microscope of FIG. 1.

With the assembly (40) in the position shown in FIG. 2 of the drawings, radiation emanating from the sample on the sample stage (12) is collected by the Cassegrain objective (18) and intercepted by the planar mirror (43) so that it is directed towards the spherical mirror (44) via a new intermediate focus (42'). The radiation is then reflected by the spherical mirror (44) and propagates as a substantially parallel beam towards the second spherical mirror (45) before being reflected back towards the second planar mirror (46) and then focused at the original intermediate focus (42). It should be noted that the cold shield (48) has an aperture formed therein through which the parallel beam can pass. Thus, by inserting the assembly of components (44 to 46) into an operative position, the image is returned to the normal position (42) of the intermediate image, but has been magnified by the magnification factor provided by the two spherical mirrors (44 and 45). Typically this factor will be in the region of four.

The assembly of magnifying elements of the present embodiment are made up of four elements (44 to 46) and these can be conveniently aligned and held rigidly in an assembly which is separate from the other elements of the microscope and simply switched into or out of the radiation beam emanating from the objective Cassegrain (18) by a rotation step in order to provide an additional four times magnification whenever that is required. The rotation step through 90° is one example of a way in which the assembly can be switched into or out of the beam and is a particularly simply arrangement. It will be apparent to those skilled in the art that a simple rotation of this form can be automated using a simple motor in conjunction with two end stops. Only one of the end stops needs to be precisely located, namely that which is used to locate the elements in the position shown in FIG. 2. The stop which controls the positioning of the assembly at its nonoperative position does not require such accurate location.

Figure 2A:
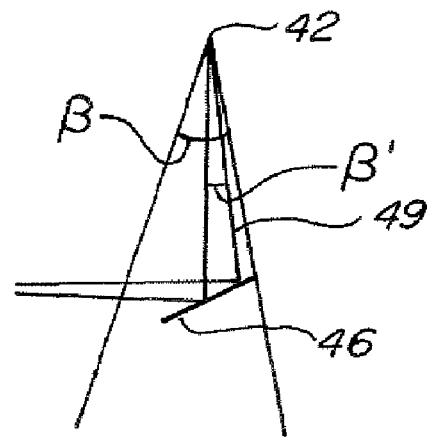
FIG. 2a shows on an enlarged scale part of the assembly of FIG. 2.

It will be seen from FIG. 2 and also particularly from FIG. 2a that when the assembly of magnifying elements is in its operative position, the cone of rays (β') arriving at the intermediate focus (42) has a narrower cone angle than that of the cone of rays (β) arriving at the intermediate focus when the magnifying assembly is not in its operative position. It should be noted that FIG. 2a is intended to illustrate the different cone angles and is not necessarily to scale. The difference in cone angles is a natural consequence of providing increased magnification. It should be noted that the beam (49) provided by the components of the magnification assembly (40) is directed at an angle to the image plane following only one side of the original cone (β) rather than a scheme of routing rays near normal to the surface. This is because the rays close to the axial direction would be intercepted by the blind spot generated by the secondary of the detector Cassegrain (34) as can be appreciated from the rays emanating from the objective Cassegrain (18). In fact the proportions of the Cassegrain elements dictate that the extra magnification introduced by the assembly should be at least four times in order to keep the exit beam narrow enough to avoid vignetting by the detector Cassegrain secondary.

It will be appreciated that the arrangement shown in FIG. 2 is one example of a magnification assembly which can be used. Other combinations of mirrors are possible such as for example a spherical mirror and a flat mirror, or two parabolic mirrors or two ellipsoidal mirrors. However, while such aspheric mirrors may provide minor improvements in image quality, they are substantially more difficult and expensive to manufacture. It is also possible to use mirrors which are toroidal approximations to the ideal shape, these mirrors being a suitable compromise between cost and quality. It will also be appreciated that it is possible to use ray trace optimisation programs in order to generate optimum surface figures that are not true conic sections.

Other geometric arrangements of rays are possible. For example it is possible to employ a scheme similar to the one illustrated in FIG. 2, but located after the intermediate image (42). In such an arrangement the image presented as an input to the magnification stage would be real and the output would be virtual as opposed to the alternative arrangement which is illustrated in FIG. 2. In a further alternative the beam from the second spherical mirror could be directed below rather than above its input to create a C-beam geometry. This scheme is probably most advantageous in an arrangement comprising a combination of two parabolic mirrors chosen to minimise aberration in this configuration.

An important factor in all alternative arrangements is the need to control image aberration, maintaining the smallest practical angle between input and output beams at each of the curved mirrors in the magnification assembly.

As referred to above when the magnification assembly is in its operative position the beam of radiation propagating towards the intermediate focus (42) has a cone angle which is narrower than that when the magnification assembly is not in its operative position. This bundle of rays propagates to the detector (32) and the result is that the detector field of view is under-filled compared with the situation when the magnifying assembly is not operative. The detector, being an MCT type detector, is typically cooled to liquid nitrogen temperatures and is usually located in a Dewar type vessel. There is the possibility with the present arrangement of enhancing the signal-to-noise ratio in the 4× magnification situation by masking out room temperature photons arriving at the detector in the unused portions of its field of view. Whilst this could be achieved by a switched cold shield inside the detector to match the field of view which exists when the 4× magnification is used this can be difficult to implement inside a Dewar container.

Figure 3:
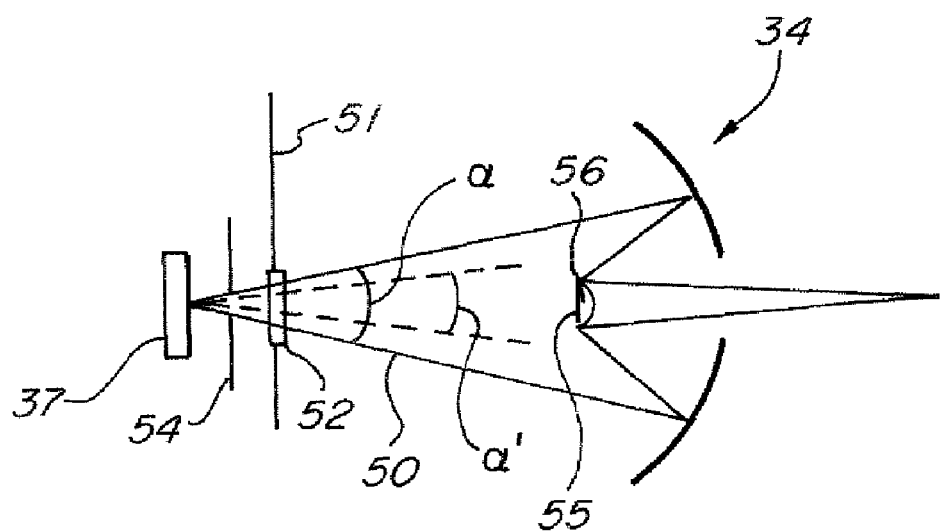
FIG. 3 illustrates the principle of a cold shield.

This will be explained initially by reference to FIG. 3. FIG. 3 shows schematically the MCT detector (32) receiving IR radiation (50) via the detector Cassegrain (34). The detector (32) is located within a Dewar vessel, whose wall is shown at (51), so that its temperature can be maintained at 77° K. Radiation to be detected enters the Dewar vessel through a window (52). A cold shield (54) is disposed between the window (52) and the detector (32) and operates to ensure that only radiation within cone angle α is incident on the detector. α is the cone angle of rays reflected from the mirror (14) when the magnification assembly (40) is not in its operative position. The cold shield (54) thus restricts the field of view of the detector (32) to that which is necessary to receive the incoming radiation (50) which is to be detected thereby substantially preventing infra red radiation from the relatively warm surrounding region from reaching the detector.

A typical detector (32) has a field of view matched to the input beam (50) at a focal ratio of about f/1. When the magnifying assembly is in its operative position the cone angle of the beam incident on the detector reduces to α' as shown in FIG. 3. The angular spread of the beam now corresponds to approximately f/4. It can be seen that in this situation the detector can receive warm photons from the region between the cones α and α'. The cold shield used for cone angle α is not appropriate for cone angle α' since it allows in these warm photons.

The cold shield is located within the Dewar vessel and it is not a simple matter to provide within that vessel a switched cold shield which could cater for both cone angles.

We have recognised that it is possible to provide a switched cold shield using an appropriate optical component or components which are disposed externally of the Dewar vessel. Any such switched cold shield should operate to image the detector onto a cold object in that part of the field of view of the detector not used for the input beam and not covered by existing cold shield (54). This could be within the interior of the Dewar detector such as the detector itself and its immediate surroundings. As an example a mirror placed outside the Dewar vessel could be located to image the detector back on itself or onto an adjacent non-reflecting cold area. Such a mirror would require in it an aperture to allow through the beam (50).

FIG. 2 shows one way in which the cold shield can be implemented using the plane mirror (48).

With the magnification assembly of FIG. 2 it is possible to provide an effective cold shield externally of the Dewar in the following way. The planar mirror (48), in which is formed a through hole, is placed between the spherical mirror (44) and (45) as shown. The hole is so dimensioned to allow the parallel beam of rays reflected from the first spherical mirror to pass through, but also to prevent rays outside that beams from propagating. More importantly, rays travelling in reverse through the system, but outside the illustrated beam, are reflected back on themselves by the plane mirror (48). The significance of this is that in unused parts of the detector field of view the detector sees in effect a reflection of itself or radiation emanating from a body at 77° K. rather than room temperature. 77° K. is typically the temperature inside a Dewar containing the MCT detector. Since the detector can have significant reflectivity it can be desirable to enhance this scheme further by tilting the plane mirror (48) slightly so that the detector images back to a spot adjacent to itself which may then be coated with a very low emissivity coating. The result is an externally switched cold shield which can minimise unwanted room temperature photons at both magnifications contributing to an improved signal-to-noise ratio.

It is also possible to improve cold shielding by minimising the effect of warm photons from other parts of the field of view of the detector. For example the rear surface (55) of the secondary mirror (56) of the detector Cassegrain assembly (34) is a source of such photons. This unwanted radiation can be effectively eliminated by placing a suitable concave spherical mirror on the rear surface (55) to augment the already described cold shielding. The input beam propagates from the annulus around the secondary mirror (56) so there is no need for any hole in this additional mirror. The effect of this additional cold shield will be most marked at the higher magnification although it will still have an effect at the lower magnification.

Figure 4:
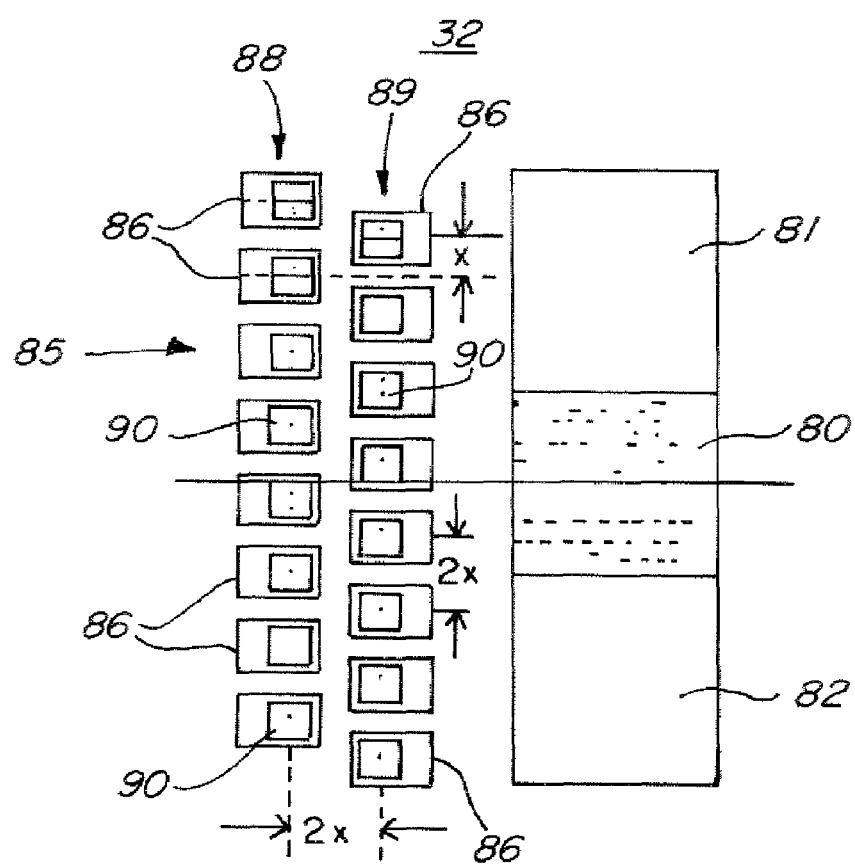
FIG. 4 is a schematic illustration of the structure of a detector in accordance with an embodiment of the present invention.

Referring now to FIG. 4 of the drawings there is shown schematically a preferred form of detector assembly for use as the detector (32) in the arrangement of FIG. 1. The detector assembly essentially comprises two parts, a first of which is a single detector element (80) of the type which has been used conventionally and on either side of which are dark areas (81 and 82). The second part comprises a small detector array shown generally at (85). The array comprises sixteen detector elements (86) which are arranged in two rows (88 and 89). Each detector element (86) has a rectangular active area (90) which is responsive to infrared radiation incident on it. The remainder of the rectangular detector element (86) denotes a possible extended electrically active area which may enhance sensitivity. The active area (90) of each detector element (86) corresponds to a pixel.

The detector elements of the array are arranged in that the centre of each element is located at a point on a square grid in which adjacent points have a spacing x.

The detector elements in each row (88, 89) are spaced apart, the spacing between the centres of adjacent elements being 2x. Similarly a line joining the centres of the active regions (90) of the row (89) is spaced from a line joining the centres of the active regions (90) of the row (88) by substantially the same distance 2x. In addition it will be seen that the elements of the row (89) are offset relative to the elements of row (88), the offset being substantially equal to x. The active areas of the elements are generally square the linear dimensions of which correspond substantially to the distance x. Each of the optically active regions (90) has an output line (not shown) which extends to processing circuitry for processing electrical signals generated by the detector elements (86) when infrared radiation falls thereon. With the arrangement shown in FIG. 4 the signal transmitted along these lines do are not required to be multiplexed so such that each detector element (86) has its own associated detection circuitry. Furthermore, because the elements of the array are not closely packed, i.e. they are spaced apart, the design of the elements can be optimized to give the best performance. For example each element can be photoconductive with improved wavelength range and the design parameter can be adjusted for the highest quantum efficiency rather than detectivity. This would best suit the relatively high signal levels present in IR microscopy. It will be appreciated that, in use, the small array shown in FIG. 4 is used to create an image 16 pixels at a time and the image is built up over a period of time in a manner similar to that carried out in existing microscopes by stepping the sample stage to map the required area of the sample under investigation. At each step of the sample stage the detector array (85) receives radiation from an area of the sample not previously covered by the array. For example, looking at FIG. 4, the sample stage could be stepped in increments corresponding to a pixel pitch so that at each step, areas of the sample corresponding to the spaces between detector elements (86) are covered at a next or subsequent step of the stage. This form of array allows an image of a sample to be built up by effectively tiling the sample.

As has been mentioned the 16 outputs from the detector elements (86) are fed in parallel to processing circuitry of the microscope and it is envisaged that with 16 parallel measurement channels a 128×128 pixel image can be obtained in around 3.5 minutes.

The array shown in FIG. 4 of the drawings has a number of advantages over the large array which has been used in conjunction with a step-scan system. It has an improved wavelength coverage relative to such a large array and also an operator can view the image in real time as it is composed rather than having to wait until the data collection is complete which is a requirement of step-scan technology. Another advantage is that of relatively rapid line scans since the minimum read-out width can be much lower than the 64 pixel width of a large array. The small array also has a greater ability to deal with samples which are not flat. With any array the entire sample area being mapped onto the array has to be in focus at the same time. Thus, for a large array not only must a large area of the sample be flat for good results, but it must also be level. This requirement is significantly reduced for a small array and it therefore is possible to adjust the focus as the sample is moved in order to cope with the samples that slope or are not flat. Another related advantage of the small array is that the quality of the image at the array need not be maintained over nearly so wide an area as with a large array. This requirement is difficult to achieve usually in the infrared where there is a limited choice of optical components available.

The arrangement shown in FIG. 4 of the drawings uses 16 detector elements, i.e. 16 pixels It will be appreciated that other numbers of detector elements can be employed, but 16 has been selected since it is a number which can be achieved economically without having to provide multiplexing. It is envisaged that a range of from 3 to 100 detector elements (86) could be used in the small array.

It will also be appreciated that various alternative configurations of detector elements (86) could be used and not only the one shown in FIG. 4. For image generation purposes some configurations are more efficient than others. Any pattern which can be repeated so that by stepping the stage it is possible to completely tile the area to be imaged without redundant measurement of any pixel is desirable. Typical images are large compared to the array and edge effects can generally be eliminated in the tiling process. A possible configuration is a 4×4 array in a close packed square, but a practical problem with such a configuration is that finite separations (known as cut lines) exist along juxtaposed portions of detector elements (86) and this can reduce the fill factor substantially below 1, thereby reducing the collection efficiency. Another problem with closely packed detector elements is that of bringing out the electrical connections from each detector element.

At the opposite extreme it is possible to use a row of 16 elements. This makes it easier to bring out the electrical connections and the cut lines only affect the fill factor in one dimension. The arrangement also has the advantage that the sample step size between successive measurements is only one pixel pitch perpendicular to the line of the detectors, whereas in the 4×4 arrangement the step size is 4 pixel pitches assuming that for efficiency each sample pixel is to be measured only once. The larger step size places a heavier demand on the stepping mechanism when stepping times are a significant factor in the overall measurement time.

The preferred arrangement is that of the type shown in FIG. 4 which comprises displacing alternate elements and staggering them in a double row. This array is particularly advantageous since it provides ample space to bring out connections and does not suffer from the disadvantage of cut lines between closely adjacent detector elements. It is possible with this arrangement to effectively fill in areas not covered at a previous part of the image acquisition process and by appropriately locating the detector elements of the array a fill-in factor of 100% can be achieved. In fact the effective fill factor can be increased above unity by arranging that the linear dimension of the region (90) of each detector element (86) is slightly larger than x. This freedom permits flexibility in a trade off between signal to noise ratio and the modulation transfer function (spatial resolution).

The staggered double row arrangement also has the advantage that the step size between measurements is one pixel pitch.

There is the slight disadvantage of edge effects at the boundaries of the area to be mapped but this can be accommodated by extending the boundary by a small amount.

It will be noted that the arrangement shown in FIG. 4 also incorporates a single large detector (80) as is present in conventional microscopes. This allows the microscope to be used in a conventional single detector manner using pixel-by-pixel mapping. Thus, the microscope can provide two modes that is rapid mapping of large areas using the small array (85) and integration of the signal from defined areas such as fibres or laminas using the single large detector (80). It should be noted that the detectivity of the single large detector need not be as high as the detectivity of the elements in the array (85) since in such single pixel measurements it is practical to allow greater time for accumulating a signal.

The areas (81 and 82) on either side of the single detector are dark areas which act as a sink for unwanted thermal background radiation, i.e. they act as a cold shield in a manner similar to that which has been described above. The single detector itself forms part of this dark area when the small array (85) is in use.

It will be appreciated that the detector shown in FIG. 4 can be fitted easily behind a suitable window and cold shield in a liquid nitrogen cooled Dewar vessel.

It will be appreciated that as an alternative to a movable stage, a movable mirror can be provided.

The invention claimed is:

1. An IR microscope comprising a sample stage, optical components for guiding analyzing radiation so that it is incident on a sample to be analyzed which is carried on said stage, and for guiding radiation from the sample to a detector,
    said detector comprises an array of individual detector elements, the outputs of the detector elements being directly fed in parallel to processing circuitry for image processing of the detector element outputs, each detector element having its own associated detection circuitry;
    said array of detectors comprising from approximately 3 to 100 individual detector elements.

2. A microscope according to claim 1, wherein the detector elements are arranged in a linear array.

3. A microscope according to claim 2, wherein the detecting elements of the linear array are spaced apart.

4. A microscope according to claim 1, wherein the detector elements are arranged in a plurality of rows.

5. A microscope according to claim 4, wherein the detector elements in each row are spaced apart and said rows are spaced apart.

6. A microscope according to claim 4, wherein the detector elements in each row are offset relative to those in a next adjacent row.

7. A microscope according to claim 1, wherein the center of each element is located at a position corresponding to a point on a regular grid.

8. A microscope according to claim 7, wherein the grid pattern is square or rectangular.

9. A microscope according to claim 7, wherein the spacing between the centers of elements in each row corresponds to a multiple of the spacing of the points on the grid.

10. A microscope according to claim 7, wherein the dimensions of each detector element are substantially equal to the spacing of the points on the grid.

11. A microscope according to claim 1, wherein the offset in detector element position in adjacent rows corresponds to the spacing of the grid or a multiple of that spacing.

12. A microscope according to claim 1, including, in addition to said detector array, a single detector element, said processing means being arranged to process output signals received from either said array or said single detector element.

13. A microscope according to claim 1 including an assembly which can be moved into or out of the beam of radiation in order to change the magnification provided by the optical elements of the microscope.

14. A microscope according to claim 13, wherein said magnifying assembly is located between an objective mirror of the microscope and its intermediate focus.

15. A microscope according to claim 13, wherein the magnifying assembly includes a reflecting element which in its operative position reflects the beam of radiation away from its normal direction of propagation and a magnifying component or components which can receive the reflected radiation.

16. A microscope according to claim 15, wherein the magnifying assembly includes first and second magnifying components, the first of which receives radiation from the reflecting element and the second of which receives the radiation from the first magnifying component, and a second reflecting element for directing radiation from the second magnifying component along its normal direction of propagation.

17. A microscope according to claim 16, wherein the first and second magnifying components comprise spherical mirrors.

18. A microscope according to claim 16, wherein the first and second reflecting elements are plane mirrors.

19. A microscope according to claim 15, wherein the assembly is movable between an operative position in which the reflecting element is located in the beam of radiation and an inoperative position in which the radiation can propagate to the detector elements without magnification by the magnifying assembly by rotation about an axis through the first and second components.

20. A microscope according to claim 13, wherein the magnifying assembly is movable between an operative and an inoperative condition by rotation about an axis.

21. A microscope according to claim 20, wherein the angle of rotation though which the assembly can be rotated is of the order of 90°.

22. A microscope according to claim 13 including a shield for shielding the detector from unwanted radiation, said shield being switchable between an operative and an inoperative position.

23. A microscope according to claim 22, wherein the shield comprises an element disposed along the propagation path of radiation reflected from the first magnifying component to the second magnifying component, said element having ing therein an aperture and acting as a cold shield to prevent at least some of the radiation from arriving at the detector.

24. A microscope according to claim 23, wherein said element comprises a plane mirror which allows through the aperture a beam of rays to be detected but substantially blocks rays outside that beam.

25. The IR microscope according to claim 1 wherein said detector comprises a photoconductive element.

26. A detector assembly for an infrared microscope comprising an array of from approximately 3 to 100 individual detector elements the outputs of which are directly fed in parallel to image processing circuitry, each detector element having its own associated detection circuitry.

27. A detector array according to claim 26, where the detector elements are located in a Dewar type vessel.

28. A microscope according to claim 27 including a shield for shielding at least one of the detector elements from unwanted radiation, said shield being switchable between an operative and an inoperative position.

29. The microscope according to claim 28 wherein said shield is located external to the Dewar type vessel.

30. A detector assembly according to claim 26, wherein said array comprises a plurality of individual detector elements, each corresponding to a pixel, which are disposed in spaced relationship, the centre to centre spacing of adjacent elements being substantially equal to or a multiple of the pixel pitch.

31. An IR microscope comprising:
a sample stage,
optical components for guiding analyzing radiation so that it is incident on a sample to be analyzed which is carried on said sample stage, and for guiding radiation from the sample to a detector, and
said detector having a plurality of individual detector elements, each corresponding to a pixel, which are disposed in spaced relationship, the centre to centre spacing of adjacent elements being substantially equal to or a multiple of the pixel pitch, the outputs of the detector elements being directly fed in parallel to image processing circuitry for processing the detector element outputs, each detector element having its own associated detection circuitry;
said array of detectors comprising from approximately 3 to 100 individual detector tor elements.

32. An IR microscope comprising a sample stage, optical components for guiding analyzing radiation so that it is incident on a sample to be analyzed which is carried on said stage, and for guiding radiation from the sample to a detector,
said detector comprising an array of from approximately 3 to 100 individual detector elements, the outputs of the detector elements being directly fed in parallel to image processing circuitry for processing of the detector element outputs;
an assembly movable between an operative and an inoperative position by rotation about an axis in order to change the magnification provided by the optical elements of the microscope.

* * * * *